(12) United States Patent
Brauer

(10) Patent No.: US 11,151,711 B2
(45) Date of Patent: Oct. 19, 2021

(54) CROSS LAYER COMMON-UNIQUE ANALYSIS FOR NUISANCE FILTERING

(71) Applicant: KLA-TENCOR CORPORATION, Milpitas, CA (US)

(72) Inventor: Bjorn Brauer, Beaverton, OR (US)

(73) Assignee: KLA-Tencor Corporation, Milpitas, CA (US)

( * ) Notice: Subject to any disclaimer, the term of this patent is extended or adjusted under 35 U.S.C. 154(b) by 109 days.

(21) Appl. No.: 16/196,090

(22) Filed: Nov. 20, 2018

(65) Prior Publication Data

US 2019/0378260 A1 Dec. 12, 2019

Related U.S. Application Data

(60) Provisional application No. 62/681,648, filed on Jun. 6, 2018.

(51) Int. Cl.
*H01L 27/14* (2006.01)
*G06T 7/00* (2017.01)

(52) U.S. Cl.
CPC .... *G06T 7/001* (2013.01); *G06T 2207/20081* (2013.01); *G06T 2207/20084* (2013.01); *G06T 2207/30148* (2013.01)

(58) Field of Classification Search
USPC ................ 382/128–130, 141–149, 168–230; 438/5–14, 28, 29
See application file for complete search history.

(56) References Cited

U.S. PATENT DOCUMENTS

| | | | |
|---|---|---|---|
| 7,760,929 B2 * | 7/2010 | Orbon | G03F 1/84 382/148 |
| 9,019,351 B2 | 4/2015 | Yu et al. | |
| 2003/0174878 A1 | 9/2003 | Levin et al. | |
| 2014/0139822 A1 * | 5/2014 | Lange | G01N 21/9501 356/51 |
| 2016/0025648 A1 * | 1/2016 | Duffy | H01J 37/222 356/237.5 |
| 2016/0153914 A1 * | 6/2016 | Lange | G03F 7/70633 356/237.5 |
| 2016/0258879 A1 | 9/2016 | Liang et al. | |
| 2017/0200264 A1 | 7/2017 | Park et al. | |
| 2018/0075594 A1 * | 3/2018 | Brauer | G01N 21/9501 |
| 2018/0130199 A1 * | 5/2018 | Brauer | G06T 7/0006 |
| 2018/0144442 A1 | 5/2018 | Brauer | |
| 2018/0157933 A1 * | 6/2018 | Brauer | G06N 3/0454 |
| 2018/0276808 A1 * | 9/2018 | Brauer | G06T 7/0006 |

FOREIGN PATENT DOCUMENTS

WO 2017087571 A1 5/2017

OTHER PUBLICATIONS

WIPO, International Search Report for PCT/US2019/035451, dated Sep. 24, 2019.

* cited by examiner

*Primary Examiner* — Marcellus J Augustin
(74) *Attorney, Agent, or Firm* — Hodgson Russ LLP

(57) ABSTRACT

Common events between layers on a semiconductor wafer are filtered. Common events should contain the majority of defects of interest. Only nuisance events that are common between layers on the semiconductor wafer remain, which reduces the nuisance rate. Defects that are common across layers can be filtered based on, for example, defect coordinates, a difference image, or defect attributes.

18 Claims, 6 Drawing Sheets

CROSS LAYER COMMON-UNIQUE ANALYSIS FOR NUISANCE FILTERING

CROSS-REFERENCE TO RELATED APPLICATIONS

This application claims priority to the provisional patent application filed Jun. 6, 2018 and assigned U.S. App. No. 62/681,648, the disclosure of which is hereby incorporated by reference.

FIELD OF THE DISCLOSURE

This disclosure relates to identifying defects on semiconductor wafers.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process induced failures, in some cases, tend to be systematic. That is, process-induced failures tend to fail at predetermined design patterns often repeated many times within the design. Elimination of spatially-systematic, electrically-relevant defects can have an impact on yield.

Optical inspection of a semiconductor wafer during manufacturing is generally a slow, manual process. Defect teams at semiconductor fabrication plant (fabs) usually use optical based tools for wafer inspection, but typically perform scanning electron microscope (SEM) review of defects for verification. Thus, for every layer inspected on an optical inspection tool, a sampled population of defects is then reviewed on an SEM tool. Manual classification of the reviewed defects is tedious and time-consuming. Fabs use automatic detection and classification schemes to save the time and effort involved in defect classification. However, the automatic detection and classification schemes have limitations and are not a replacement for a human classification. Besides requiring large computation power, automatic detection and classification schemes are prone to nuisance or instances of multiple, non-important defects. An optimal inspection recipe for a semiconductor layer should detect as many defects of interest (DOIs) as possible while maintaining a substantially low nuisance rate.

One technique runs a "hot" inspection thereby increasing the likelihood of detecting DOI but at the expense of substantially high nuisance rates. A hot inspection can be run more aggressively (hotter), which means with substantially aggressive defect detection thresholds, so that more events, including defects and nuisance events, are detected than desired in a tuned inspection. In this manner, such an inspection would not be useful for production monitoring due to the substantially high nuisance event detection.

The user then takes the wafer to an SEM for review. The user reviews the defects using the SEM and classifies the defects as real, nuisance, or DOI. Once enough of each type of defect is classified, the user attempts to set the defect detection parameter values to create a recipe that will detect enough of the DOI and have as few of the detected nuisance defects as possible. The more defects that are classified, the better the recipe can be. The user may then re-inspect the wafer using the new recipe and use the SEM to review the defects detected on the wafer using the new recipe. In this manner, re-inspection and defect review may be performed in an iterative manner until the user determines that satisfactory defect detection can be achieved by the recipe based on defect review results. This is a slow, labor-intensive process.

Nuisance have been filtered using inspection layer defect attributes. This poses a problem, however, because DOI and nuisance tend to have similar defect attributes. This prevents sufficient separation of DOI and nuisance.

Defect source analysis (DSA) can filter previous layer nuisance. DSA may be coordinate-based or image-based. An earlier layer is removed from a later layer to find events. DSA treats common events between previous and current layers as nuisance. This may only be effective if the current layer nuisance is also present in the previous layer and if the previous layer does not have the DOI. This technique will miss defects that are present in both layers and may present nuisance as DOI. DOI may be introduced in a previous layer, but the DOI signal starts weak and increases in a subsequent layer.

Multi-mode nuisance reduction, such as image fusion, also was used to reduce nuisance. This technique assumes that imaging defects with different modes will allow separation of DOI and nuisance events. However, most DOI and nuisance tend to resemble each other in different modes, which reduces effectiveness of this technique.

Therefore, an improved technique to find DOI is needed.

BRIEF SUMMARY OF THE DISCLOSURE

A system is provided in a first embodiment. The system includes a light source that generates a beam of light; a stage configured to hold a semiconductor wafer in a path of the beam of light; a detector that receives the beam of light reflected from the semiconductor wafer; and a processor in electronic communication with the detector. The processor is configured to report a location of a DOI that is common across a first layer and a second layer of the semiconductor wafer based on defect locations, difference images, or defect attributes.

In an instance, the processor is configured to: receive defect locations of the first layer of the semiconductor wafer; receive defect locations of the second layer of the semiconductor wafer; perform common-unique analysis; and filter all common events thereby excluding a unique location. The location of the DOI is based on one of the common events.

The processor may be further configured to retrieve the defect locations of the first layer and the defect locations of the second layer from a database.

The processor may be further configured to receive defect attributes of the first layer and the defect attributes of the second layer. The defect attributes can include signal strength, shape, size, location relative to a point, brightness, difference in brightness relative to background, or location on a design. Filtering all the common events can use the defect attributes.

The system can include a machine learning module operated by the processor. The machine learning module can be configured to filter all the common events.

Using the light source and the detector, the processor can be further configured to provide instructions to the system to perform a hot scan of the semiconductor wafer that provides the defect locations of the first layer and the defect locations of the second layer.

In another instance, the processor is configured to: receive a difference image of the first layer for each defect location on the first layer of the semiconductor wafer; receive a difference image of the second layer for each defect location on the second layer of the semiconductor wafer; compare the difference image of the first layer and the difference image of the second layer; and filter defects for which the difference image of the first layer and the difference image of the second layer are similar thereby determining the DOI. The difference image of the first layer is between neighboring dies on the first layer. The difference image of the second layer is between neighboring dies on the second layer.

Using the light source and the detector, the processor can be configured to provide instructions to the system to perform a hot scan of the semiconductor wafer that is used to generate the difference image of the first layer and the difference image of the second layer.

In another instance, the processor is configured to: receive a test image and a reference image for each defect location on the first layer of the semiconductor wafer; receive a test image and a reference image for each defect location on the second layer of the semiconductor wafer; calculate one or more attributes using a machine learning module operated by the processor; and filter nuisance events with the one or more attributes thereby determining the DOI. The one or more attributes filter nuisance events and are based on the test image and the reference image for the first layer and the second layer. The test image and the reference image for the first layer and the second layer are used as channels.

The machine learning module can include a convolutional neural network.

The processor may be configured to identify a new attribute to filter the nuisance events based on the test image and the reference image for the first layer and the second layer.

Using the light source and the detector, the processor may be configured to provide instructions to the system to perform a hot scan of the semiconductor wafer that is used to generate the test image and the reference image of the first layer and the test image and the reference image of the second layer.

A method is provided in a second embodiment. The method comprises performing a hot scan of a semiconductor wafer using a wafer inspection system, and reporting, using a processor, a location of a DOI on the semiconductor wafer that is common across a first layer and a second layer of the semiconductor wafer based on defect locations, difference images, or defect attributes.

In an instance, the method further comprises: receiving, at the processor, defect locations of the first layer of the semiconductor wafer; receiving, at the processor, defect locations of the second layer of the semiconductor wafer; performing, using the processor, common-unique analysis; and filtering, using the processor, all common events thereby excluding a unique location. The reporting the location of the DOI is based on one of the common events.

The method can further include retrieving the defect locations of the first layer and the defect locations of the second layer from a database.

The defect locations of the first layer and the defect locations of the second layer can include nuisance and the DOI.

The method can further include receiving, at the processor, defect attributes of the first layer and the defect attributes of the second layer. The defect attributes can include signal strength, shape, size, location relative to a point, brightness, difference in brightness relative to background, or location on a design. Filtering all the common events can use the defect attributes.

In another instance, the method further comprises: receiving, at the processor, a difference image of the first layer for each defect location on the first layer of the semiconductor wafer; receiving, at the processor, a difference image of the second layer for each defect location on the second layer of the semiconductor wafer; comparing, using the processor, the difference image of the first layer and the difference image of the second layer; and filtering, using the processor, defects for which the difference image of the first layer and the difference image of the second layer are similar thereby determining the defects of interest. The difference image of the first layer is between neighboring dies on the first layer. The difference image of the second layer is between neighboring dies on the second layer.

The difference image of the first layer and the difference image of the second layer may each be a patch image.

In an instance, the method further comprises: receiving, at the processor, a test image and a reference image for each defect location on the first layer of the semiconductor wafer; receiving, at the processor, a test image and a reference image for each defect location on the second layer of the semiconductor wafer; calculating, using the processor, one or more attributes using a machine learning module operated by the processor; and filtering, using the processor, nuisance events with the one or more attributes thereby determining the DOI. The one or more attributes filter nuisance events and are based on the test image and the reference image for the first layer and the second layer. The test image and the reference image for the first layer and the second layer are used as channels.

A difference image can be formed from the test image and the reference image corresponding to the test image. The difference image can be used as one of the channels.

A difference image can be formed between neighboring dies on the test image on the first layer or the test image on the second layer.

The method can further include identifying a new attribute, using the processor, to filter the nuisance events based on the test image and the reference image for the first layer and the second layer.

A non-transitory computer readable medium storing a program can configured to instruct a processor to execute an instance of the method of the second embodiment.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein reduce nuisance rate to find a DOI when there is a high nuisance rate on all possible inspection layers. The disclosed techniques can improve sensitivity to DOI and reduce nuisance in situations or on layers the previous techniques could not address.

Figure 1:
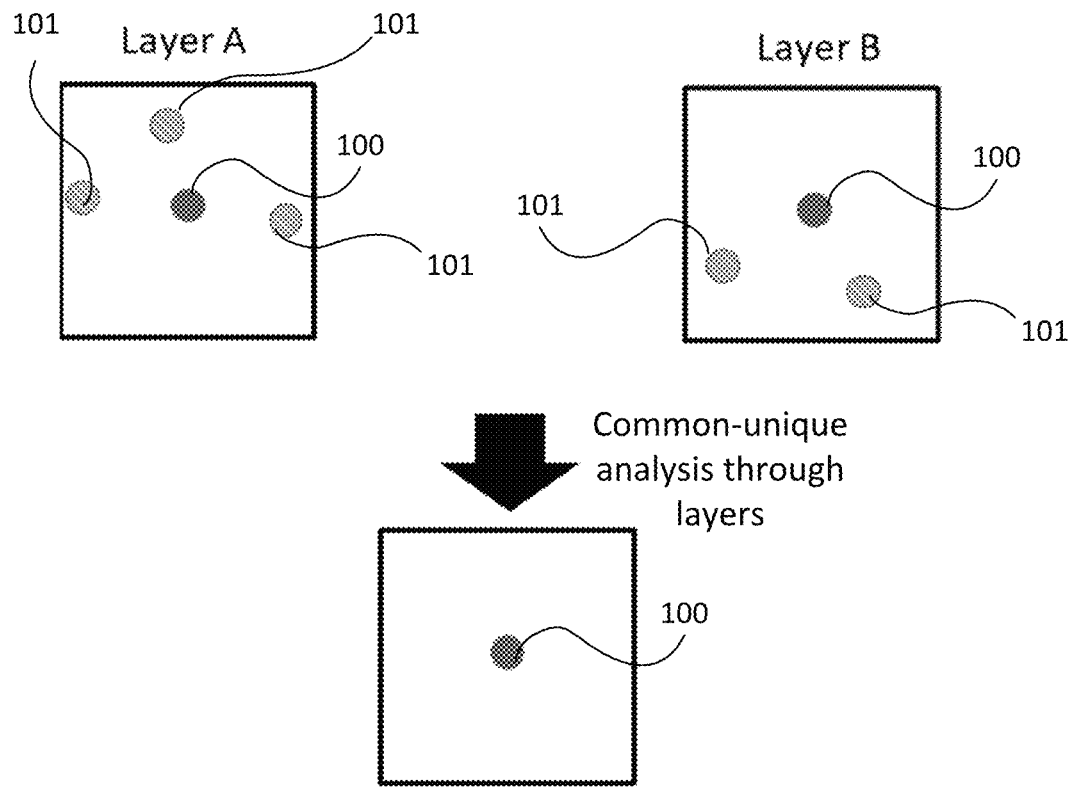
FIG. 1 is a diagram disclosing a technique in accordance with the present disclosure.

FIG. 1 illustrates an example. The DOI 100 can be detected on several layers of a wafer. In the diagram of FIG. 1, the two layers are labelled Layer A and Layer B. These layers can be sequential or non-sequential among the manufactured layers on a wafer. For example, Layer A may be the previous layer in a series with respect to Layer B. In FIG. 1, the rate of nuisance 101 on both Layer A and Layer B is high. The dominating nuisance source can vary with different inspection steps. Thus, the nuisance 101 is different between Layer A and Layer B and the nuisance can occur at different x, y locations on the layer.

Using techniques disclosed herein, common events are filtered. Common events should contain the majority of the DOI 100. Only nuisance 101 events that are common between Layer A and Layer B remain, which reduces the nuisance rate. Thus, less nuisance 101 is observed after common-unique analysis than on either of Layer A or Layer B. Common events can be considered DOI and unique events can be considered as nuisance. In an instance, only DOI 100 remain after using the techniques disclosed herein because nuisance 101 is removed or otherwise excluded.

Defects that are common across layers can be filtered based on, for example, a defect location, a difference image, or a defect attribute. Tuning of common events can be performed using attributes of the defects from the Layer A and Layer B. For example, tuning of common events can be performed using a machine learning module with attributes of the defects from the Layer A and Layer B.

Figure 2:
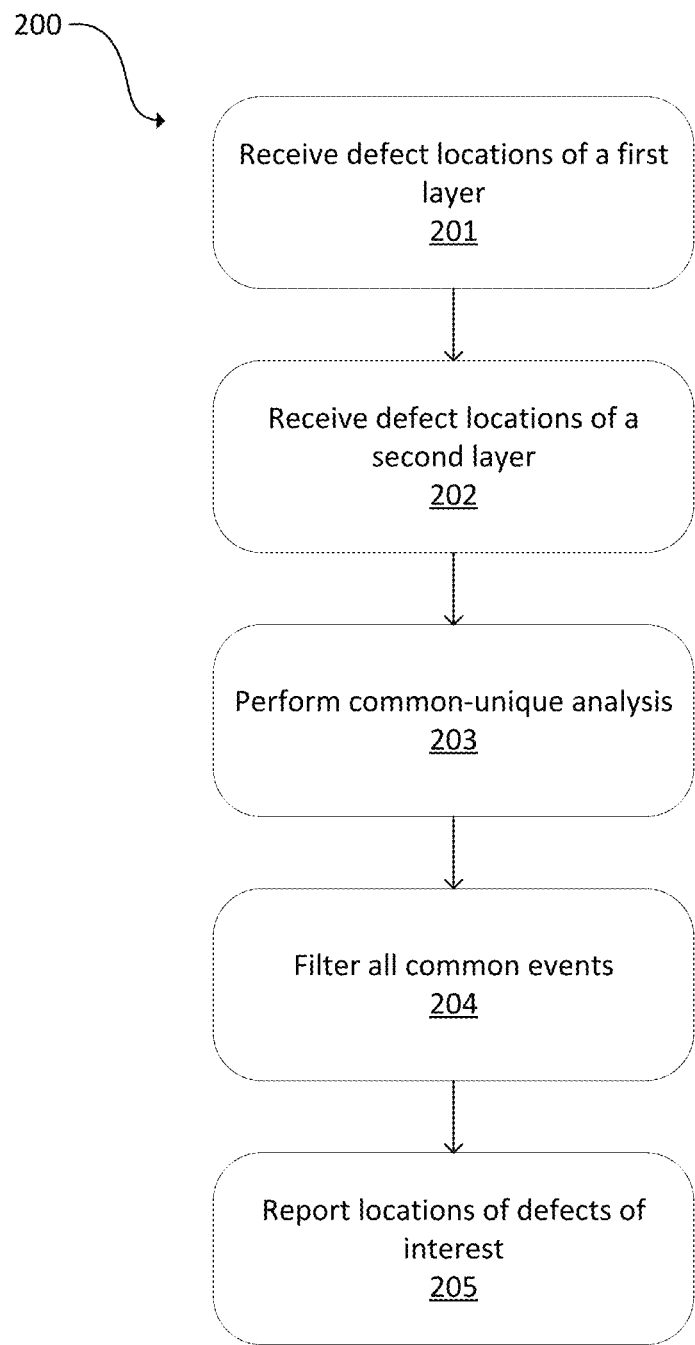
FIG. 2 is a flowchart of a first method embodiment in accordance with the present disclosure.

FIG. 2 is a flowchart of a first method 200. Defect locations of a first layer are received at 201 and defect locations of a second layer are received at 202. The first layer and the second layer can be, for example, Layer A and Layer B of FIG. 1. The defect locations of the first layer and/or second layer can be retrieved from a database. These defect locations can include nuisance and DOI.

Common-unique analysis is performed at 203. This can determine events that exist across layers or events that are unique to one layer. All common events are filtered at 204. This can exclude unique locations. For example, an event may be filtered when the event is seen in a first layer and in a second layer at a similar location (e.g., within a 0.25 µm radius or within other radii). The proximity of the events on the layers can vary depending on the tool or the design. Location of the defects of interest are reported at 205 based on the unique locations or the common events.

The common-unique analysis at 203 and filtering at 204 may occur in two steps or may occur in a single step. In an instance, the algorithm may identify unique events with the common-unique analysis at 203, but a user may only see the unique events after filtering at 204.

A hot scan may be performed to provide the defect locations of the first layer and the second layer. Instructions can be provided, such as by a processor, to perform the hot scan.

Figure 3:
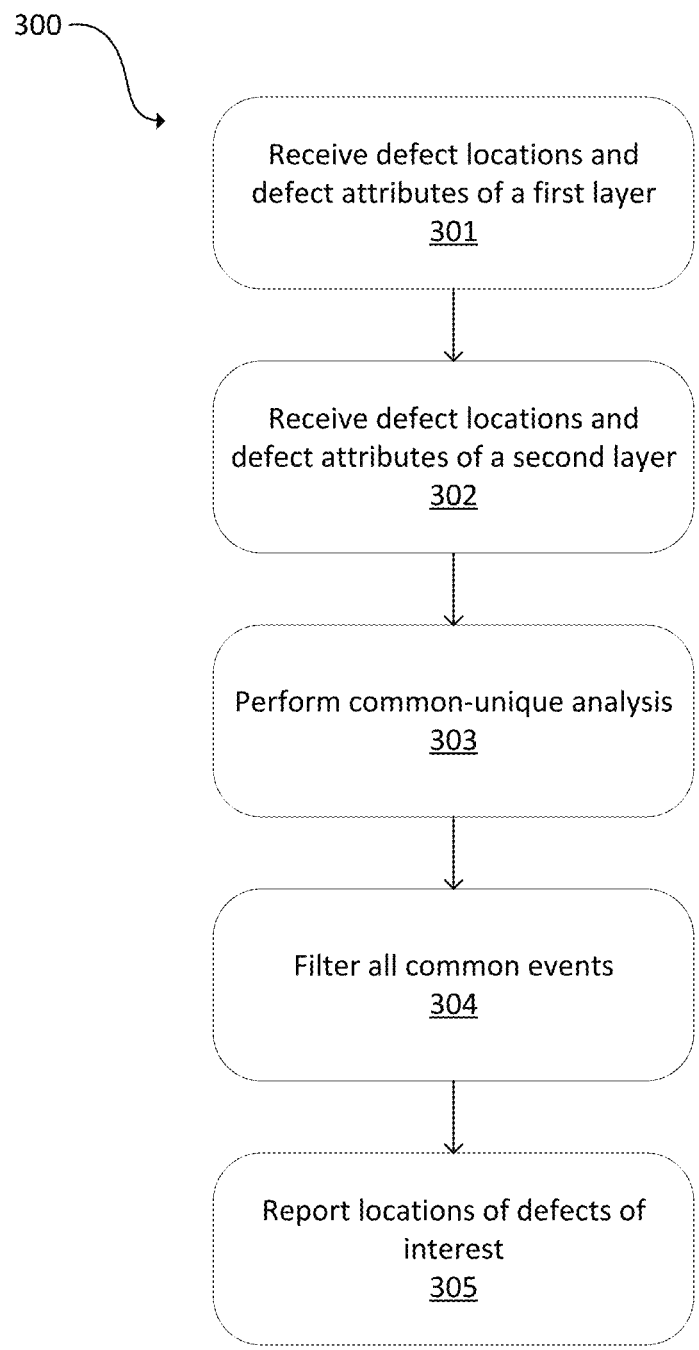
FIG. 3 is a flowchart of a second method embodiment in accordance with the present disclosure.

FIG. 3 is a flowchart of a second method 300. Defect locations of a first layer are received at 301 and defect locations of a second layer are received at 302. The first layer and the second layer can be, for example, Layer A and Layer B of FIG. 1. Defect attributes for each of the defect locations of the first layer and/or the second layer also are received at 301 and 302. The defect locations of the first layer and/or second layer and the defect attributes can be retrieved from a database. These defect locations can include nuisance and DOI.

The defect attributes can include signal strength, shape, size, location relative to a point on the wafer, brightness, difference in brightness relative to background, or location on a design. Other defect attributes are possible. In an instance, image frames are collected for the test and reference dies on different layers. A difference image frame is calculated for each of these test reference frame pairs on each layer. Attributes are calculated using those image frames (test, reference, and difference).

Common-unique analysis is performed at 303. All common events are filtered at 304. This excludes unique locations. In an instance, a single attribute or a combination of attributes can be used to filter common events. If the attributes are similar (e.g., within a threshold), assuming the defect location is the same for the different layers, then it means those are real common events in terms of location and in terms of attributes (e.g. size, shape, signal intensity, etc.). The attributes can be used as additional nuisance filter. The defect attributes are used to filter common events. Location of the defects of interest are reported at 305.

The common-unique analysis at 303 and filtering at 304 may occur in two steps or may occur in a single step. In an instance, the algorithm may identify unique events with the common-unique analysis at 303, but a user may only see the unique events after filtering at 304.

A hot scan may be performed to provide the defect locations of the first layer and the second layer. Instructions can be provided, such as by a processor, to perform the hot scan.

The method 300 may perform better than the method 200 with some examples of busy images with more defects because it allows further nuisance reduction by picking attributes in addition to coordinate-based common-unique analysis across different layers.

A machine learning module, such as a machine learning module operated by a processor, can be configured to filter the common events. The machine learning module can have one of the configurations described further herein. For example, the machine learning module can include or otherwise operate a deep learning algorithm. Rooted in neural network technology, deep learning is a probabilistic graph model with many neuron layers, commonly known as a deep architecture. Deep learning technology processes the information such as image, text, voice, and so on in a hierarchical manner. In using deep learning in the present disclosure, feature extraction is accomplished automatically using learning from data. For example, defects can be classified, sorted, or binned using the machine learning module based on the one or more extracted features.

Generally speaking, deep learning (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output, allowing the algorithm to use multiple processing layers, composed of multiple linear and non-linear transformations.

Deep learning is part of a broader family of machine learning methods based on learning representations of data. An observation (e.g., a feature to be extracted for reference) can be represented in many ways such as a vector of intensity values per pixel, or in a more abstract way as a set of edges, regions of particular shape, etc. Some representations are better than others at simplifying the learning task (e.g., face recognition or facial expression recognition). Deep learning can provide efficient algorithms for unsupervised or semi-supervised feature learning and hierarchical feature extraction.

Research in this area attempts to make better representations and create models to learn these representations from large-scale data. Some of the representations are inspired by advances in neuroscience and are loosely based on interpretation of information processing and communication patterns in a nervous system, such as neural coding which attempts to define a relationship between various stimuli and associated neuronal responses in the brain.

There are many variants of neural networks with deep architecture depending on the probability specification and network architecture, including, but not limited to, Deep Belief Networks (DBN), Restricted Boltzmann Machines (RBM), and Auto-Encoders. Another type of deep neural network, a convolutional neural network (CNN), can be used for feature analysis. The actual implementation may vary depending on the size of input images, the number of features to be analyzed, and the nature of the problem. Other layers may be included in the machine learning module besides the neural networks disclosed herein.

In an embodiment, the deep learning model is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. Machine learning explores the study and construction of algorithms that can learn from and make predictions on data. Such algorithms overcome following strictly static program instructions by making data driven predictions or decisions, through building a model from sample inputs.

In some embodiments, the deep learning model is a generative model. A generative model can be generally defined as a model that is probabilistic in nature. In other words, a generative model is one that performs forward simulation or rule-based approaches. The generative model can be learned (in that its parameters can be learned) based on a suitable training set of data. In one embodiment, the deep learning model is configured as a deep generative model. For example, the model may be configured to have a deep learning architecture in that the model may include multiple layers, which perform a number of algorithms or transformations.

In another embodiment, the deep learning model is configured as a neural network. In a further embodiment, the deep learning model may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the deep learning model used for the semiconductor inspection applications disclosed herein is configured as an AlexNet. For example, an AlexNet includes a number of convolutional layers (e.g., 5) followed by a number of fully connected layers (e.g., 3) that are, in combination, configured and trained to analyze features for determining rotation and translation offsets. In another such embodiment, the deep learning model used for the semiconductor inspection applications disclosed herein is configured as a GoogleNet. For example, a GoogleNet may include layers such as convolutional, pooling, and fully connected layers such as those described further herein configured and trained to analyze features for determining rotation and translation offsets. While the GoogleNet architecture may include a relatively high number of layers (especially compared to some other neural networks described herein), some of the layers may be operating in parallel, and groups of layers that function in parallel with each other are generally referred to as inception modules. Other of the layers may operate sequentially. Therefore, GoogleNets are different from other neural networks described herein in that not all of the layers are arranged in a sequential structure. The parallel layers may be similar to Google's Inception Network or other structures.

In a further such embodiment, the deep learning model used for the semiconductor inspection applications disclosed herein is configured as a Visual Geometry Group (VGG) network. For example, VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to analyze features for determining rotation and translation offsets. VGG networks also include convolutional layers followed by fully connected layers.

In some such embodiments, the deep learning model used for the semiconductor inspection applications disclosed herein is configured as a deep residual network. For example, like some other networks described herein, a deep residual network may include convolutional layers followed by fully-connected layers, which are, in combination, configured and trained for feature property extraction. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart.

In some embodiments, the information determined by the deep learning model includes feature properties extracted by the deep learning model. In one such embodiment, the deep learning model includes one or more convolutional layers. The convolutional layer(s) may have any suitable configuration known in the art. In this manner, the deep learning model (or at least a part of the deep learning model) may be configured as a CNN. For example, the deep learning model may be configured as a CNN, which is usually stacks of convolution and pooling layers, to extract local features. The embodiments described herein can take advantage of deep learning concepts such as a CNN to solve the normally intractable representation inversion problem. The deep learning model may have any CNN configuration or architecture known in the art. The one or more pooling layers may also have any suitable configuration known in the art (e.g., max pooling layers) and are generally configured for reducing the dimensionality of the feature map generated by the one or more convolutional layers while retaining the most important features.

In general, the deep learning model described herein is a trained deep learning model. For example, the deep learning model may be previously trained by one or more other systems and/or methods. The deep learning model is already generated and trained and then the functionality of the model is determined as described herein, which can then be used to perform one or more additional functions for the deep learning model.

As stated above, although a CNN is used herein to illustrate the architecture of a deep learning system, the present disclosure is not limited to a CNN. Other variants of deep learning architectures may be used in embodiments. For example, Auto-Encoders, DBNs, and RBMs, can be used. Random forests also can be used.

Training data may be inputted to model training (e.g., CNN training), which may be performed in any suitable manner. For example, the model training may include inputting the training data to the deep learning model (e.g., a CNN) and modifying one or more parameters of the model until the output of the model is the same as (or substantially the same as) external validation data. Model training may generate one or more trained models, which may then be sent to model selection, which is performed using validation data. The results that are produced by each one or more trained models for the validation data that is input to the one or more trained models may be compared to the validation data to determine which of the models is the best model. For example, the model that produces results that most closely match the validation data may be selected as the best model. Test data may then be used for model evaluation of the model that is selected (e.g., the best model). Model evaluation may be performed in any suitable manner. Best model may also be sent, to model deployment in which the best model may be sent to the semiconductor inspection tool for use (post-training mode).

Figure 4:
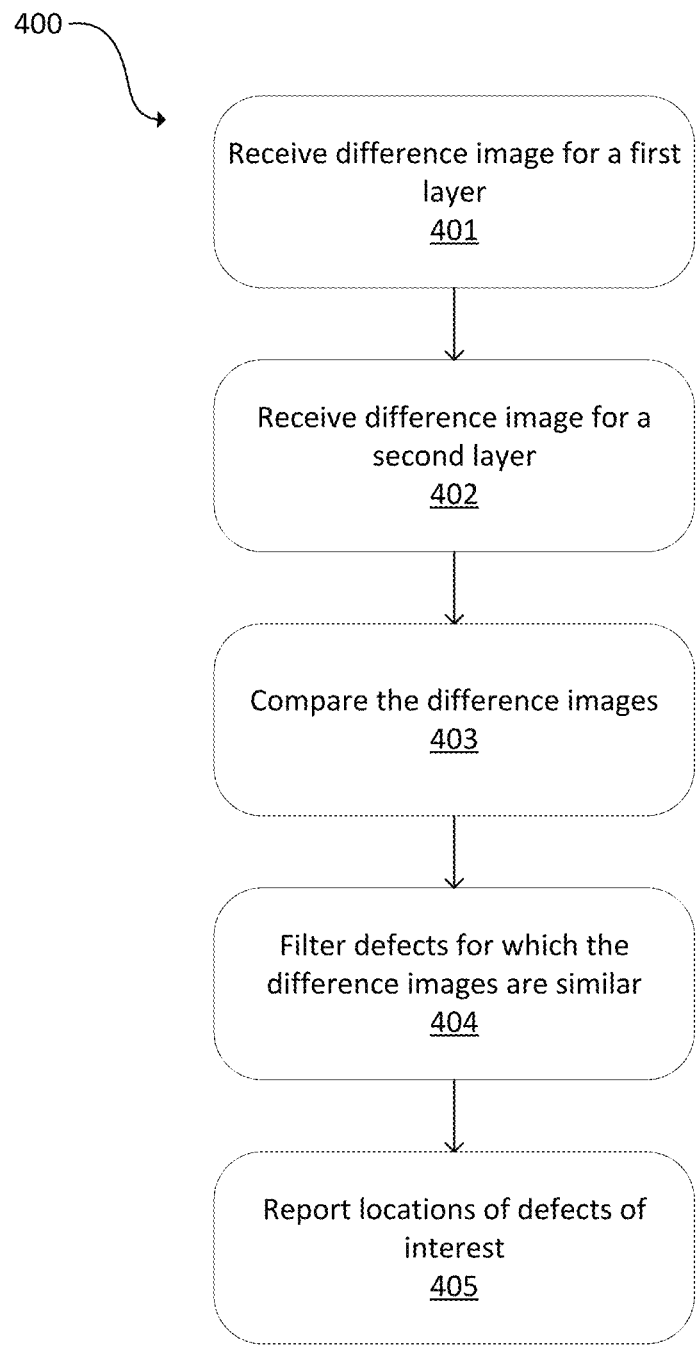
FIG. 4 is a flowchart of a third method embodiment in accordance with the present disclosure.

FIG. 4 is a flowchart of a third method 400. A difference image of a first layer for each defect location is received at 401 and a difference image of a second layer for each defect location is received at 402. The first layer and the second layer can be, for example, Layer A and Layer B of FIG. 1. These defect locations can include nuisance and DOI. The difference images may be between neighboring dies on the first layer or second layer. The difference images may be patch images. For example, the difference images may be 32 pixel by 32 pixel patch images. Other patch image configurations are possible.

The difference image of the first layer and the difference image of the second layer are compared at 403. For example, image subtraction may be used for the comparison at 403. This is a form of a common-unique analysis.

All defects that are similar in the difference images of the first layer and second layer are filtered at 404. A threshold can be used to determine defects that are similar. The threshold can be based on signal intensity in a calculated cross-layer difference image. This excludes unique locations. Location of the defects of interest are reported at 405.

A hot scan may be performed to provide the defect locations of the first layer and the second layer. A hot scan may be performed to provide the difference images of the first layer and the second layer. Instructions can be provided, such as by a processor, to perform the hot scan.

The method 400 may be used if some attributes are known to work well for defect detection. If it is obvious that certain nuisance events (e.g., nuisance which always happens on the same pattern) can be eliminated with a certain attribute because it separates this nuisance from DOI, then this attribute can be used to remove such nuisance ahead of time.

This can enable a hotter scan to be run in other regions because total defect count will not be maxed out.

Figure 5:
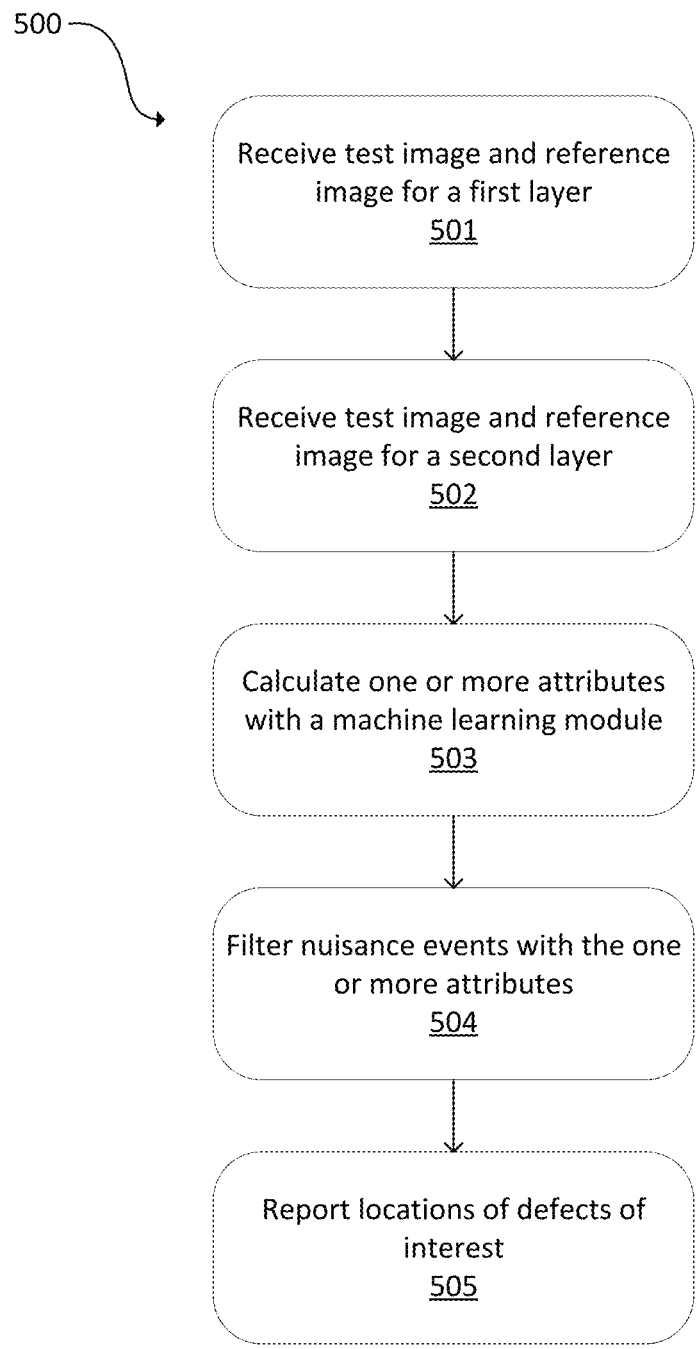
FIG. 5 is a flowchart of a fourth method embodiment in accordance with the present disclosure.

FIG. 5 is a flowchart of a fourth method 500. A test image and a reference image for each defect location on a first layer for each defect location is received at 501 and a test image and a reference image for each defect location on a second layer for each defect location is received at 502. The first layer and the second layer can be, for example, Layer A and Layer B of FIG. 1. These defect locations can include nuisance and DOI.

The test image and reference image may be a 32 pixel by 32 pixel patch image, though other sizes are possible. The defect may be in the middle of the patch image.

The reference image may be from a neighboring die or dies or may be the mean of several neighboring dies, or a standard die, or a specially-computed reference die. A specially-computed reference die may be used for methods 200-500.

One or more attributes are calculated at 503 using a machine learning module (such as the machine learning module described with respect to method 200). This calculation may use logit values that are the output of the fully-connected layer or other techniques. The machine learning module can include a CNN or other algorithms. This is a form of a common-unique analysis. The one or more attributes can filter nuisance events and are based on the test image and the reference image for the first layer and the second layer. The test image and the reference image for the first layer and the second layer are used as channels.

Nuisance events with the one or more attributes are filtered at 504. This excludes unique locations. For example, if logit values are used then all the defects with high logit values may be kept. Location of the defects of interest are optionally reported at 505.

The method 500 can be used if the best attribute for filtering DOI is not known because the logit values may be obtained after the machine learning module has been trained on this defect data set. This means that these logit values should be equal or better than the combination of existing attributes assuming that enough training data is provided.

A hot scan may be performed to provide the defect locations of the first layer and the second layer. A hot scan may be performed to provide the test image and the reference image of the first layer and the second layer. Instructions can be provided, such as by a processor, to perform the hot scan.

A difference image can be formed from the test image and the reference image corresponding to the test image. The resulting difference image can be used as one of the channels. A difference image also can be formed between neighboring dies on the test image on the first layer or the test image on the second layer.

A processor can be configured to identify a new attribute (e.g., logit value) to filter the nuisance events based on the test image and the reference image for the first layer and the second layer. For example, the machine learning module can be used to identify a new attribute to filter nuisance events.

In an instance, the method 200 is performed. Then method 300, method 400, or method 500 is performed after method 200. Nuisance events may be removed by method 200 prior to further analysis by method 300, method 400, or method 500. Potential nuisance events identified using method 200 also may be left for further analysis by method 300, method 400, or method 500 (i.e., the method 300, method 400, or method 500 operates independent of method 200). Use of more than one of the methods 200-500 may occur if the DOI is weak and the amount of nuisance is high. Use of more than one of the methods 200-500 also may occur if the method 200 does not filter out enough nuisance events or drops DOI. For example, method 300 may be performed after method 200 if there is a weak signal for DOI. In another example, method 400 or method 500 may be performed after method 200 if there is a high amount of nuisance.

The methods 200-500 can be performed on a processor. The processor may be in electronic communication with a detector.

Figure 6:
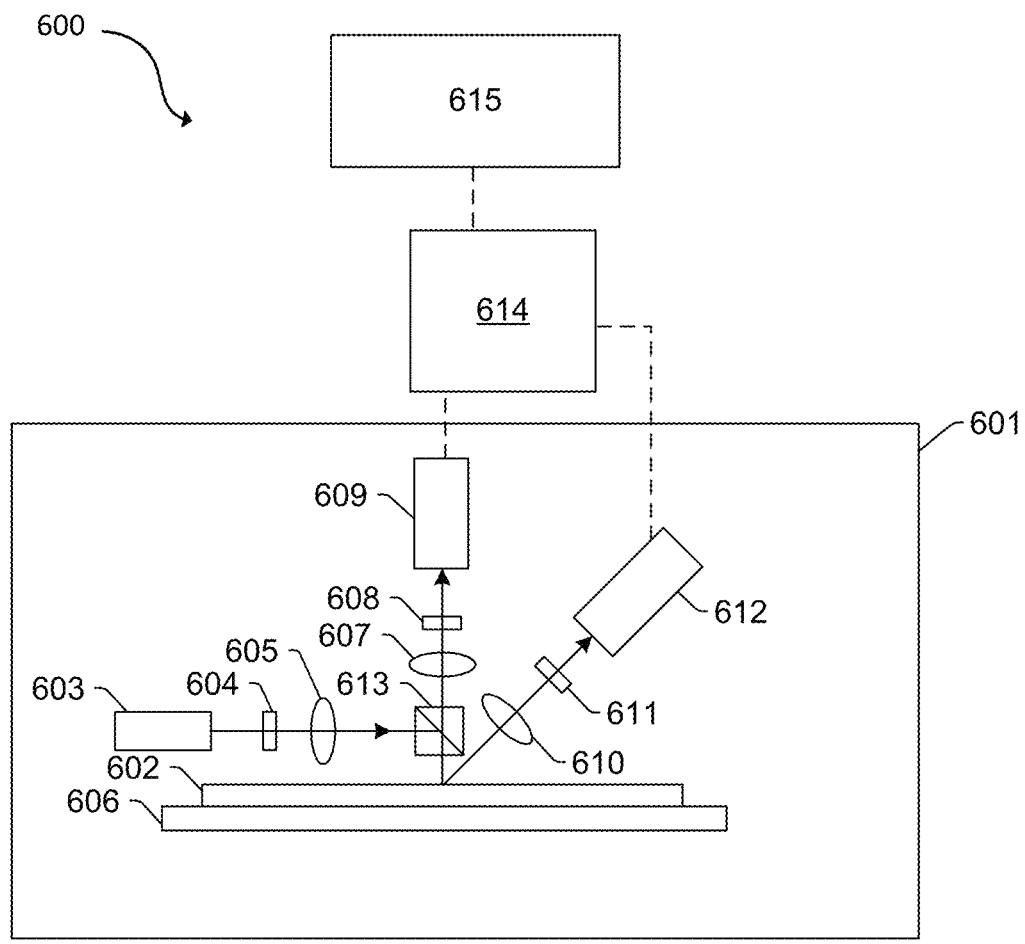
FIG. 6 is block diagram of a system in accordance with the present disclosure.

FIG. 6 is a block diagram of a system 600. The system 600 includes optical based subsystem 601. In general, the optical based subsystem 601 is configured for generating optical based output for a specimen 602 by directing light to (or scanning light over) and detecting light from the specimen 602. In one embodiment, the specimen 602 includes a wafer. The wafer may include any wafer known in the art. In another embodiment, the specimen includes a reticle. The reticle may include any reticle known in the art.

In the embodiment of the system 600 shown in FIG. 6, optical based subsystem 601 includes an illumination subsystem configured to direct light to specimen 602. The illumination subsystem includes at least one light source. For example, as shown in FIG. 6, the illumination subsystem includes light source 603. In one embodiment, the illumination subsystem is configured to direct the light to the specimen 602 at one or more angles of incidence, which may include one or more oblique angles and/or one or more normal angles. For example, as shown in FIG. 6, light from light source 603 is directed through optical element 604 and then lens 605 to specimen 602 at an oblique angle of incidence. The oblique angle of incidence may include any suitable oblique angle of incidence, which may vary depending on, for instance, characteristics of the specimen 602.

The optical based subsystem 601 may be configured to direct the light to the specimen 602 at different angles of incidence at different times. For example, the optical based subsystem 601 may be configured to alter one or more characteristics of one or more elements of the illumination subsystem such that the light can be directed to the specimen 602 at an angle of incidence that is different than that shown in FIG. 6. In one such example, the optical based subsystem 601 may be configured to move light source 603, optical element 604, and lens 605 such that the light is directed to the specimen 602 at a different oblique angle of incidence or a normal (or near normal) angle of incidence.

In some instances, the optical based subsystem 601 may be configured to direct light to the specimen 602 at more than one angle of incidence at the same time. For example, the illumination subsystem may include more than one illumination channel, one of the illumination channels may include light source 603, optical element 604, and lens 605 as shown in FIG. 6 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 602 at different angles of incidence may be different such that light resulting from illumination of the specimen 602 at the different angles of incidence can be discriminated from each other at the detector(s).

In another instance, the illumination subsystem may include only one light source (e.g., light source 603 shown in FIG. 6) and light from the light source may be separated into different optical paths (e.g., based on wavelength, polarization, etc.) by one or more optical elements (not shown) of the illumination subsystem. Light in each of the different optical paths may then be directed to the specimen 602. Multiple illumination channels may be configured to direct light to the specimen 602 at the same time or at different times (e.g., when different illumination channels are used to sequentially illuminate the specimen). In another instance, the same illumination channel may be configured to direct light to the specimen 602 with different characteristics at different times. For example, in some instances, optical element 604 may be configured as a spectral filter and the properties of the spectral filter can be changed in a variety of different ways (e.g., by swapping out the spectral filter) such that different wavelengths of light can be directed to the specimen 602 at different times. The illumination subsystem may have any other suitable configuration known in the art for directing the light having different or the same characteristics to the specimen 602 at different or the same angles of incidence sequentially or simultaneously.

In one embodiment, light source 603 may include a broadband plasma (BBP) source. In this manner, the light generated by the light source 603 and directed to the specimen 602 may include broadband light. However, the light source may include any other suitable light source such as a laser or lamp. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 603 may also include a polychromatic light source that generates light at multiple discrete wavelengths or wavebands.

Light from optical element 604 may be focused onto specimen 602 by lens 605.

Although lens 605 is shown in FIG. 6 as a single refractive optical element, it is to be understood that, in practice, lens 605 may include a number of refractive and/or reflective optical elements that in combination focus the light from the optical element to the specimen. The illumination subsystem shown in FIG. 6 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 613), aperture(s), and the like, which may include any such suitable optical elements known in the art. In addition, the optical based subsystem 601 may be configured to alter one or more of the elements of the illumination subsystem based on the type of illumination to be used for generating the optical based output.

The optical based subsystem 601 may also include a scanning subsystem configured to cause the light to be scanned over the specimen 602. For example, the optical based subsystem 601 may include stage 606 on which specimen 602 is disposed during optical based output generation. The scanning subsystem may include any suitable mechanical and/or robotic assembly (that includes stage 606) that can be configured to move the specimen 602 such that the light can be scanned over the specimen 602. In addition, or alternatively, the optical based subsystem 601 may be configured such that one or more optical elements of the optical based subsystem 601 perform some scanning of the light over the specimen 602. The light may be scanned over the specimen 602 in any suitable fashion such as in a serpentine-like path or in a spiral path.

The optical based subsystem 601 further includes one or more detection channels. At least one of the one or more detection channels includes a detector configured to detect light from the specimen 602 due to illumination of the specimen 602 by the subsystem and to generate output responsive to the detected light. For example, the optical based subsystem 601 shown in FIG. 6 includes two detection channels, one formed by collector 607, element 608, and detector 609 and another formed by collector 610, element 611, and detector 612. As shown in FIG. 6, the two detection channels are configured to collect and detect light at different angles of collection. In some instances, both detection channels are configured to detect scattered light, and the detection channels are configured to detect light that is scattered at different angles from the specimen 602. However, one or more of the detection channels may be configured to detect another type of light from the specimen 602 (e.g., reflected light).

As further shown in FIG. 6, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 610, element 611, and detector 612 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 6 shows an embodiment of the optical based subsystem 601 that includes two detection channels, the optical based subsystem 601 may include a different number of detection channels (e.g., only one detection channel or two or more detection channels). In one such instance, the detection channel formed by collector 610, element 611, and detector 612 may form one side channel as described above, and the optical based subsystem 601 may include an additional detection channel (not shown) formed as another side channel that is positioned on the opposite side of the plane of incidence. Therefore, the optical based subsystem 601 may include the detection channel that includes collector 607, element 608, and detector 609 and that is centered in the plane of incidence and configured to collect and detect light at scattering angle(s) that are at or close to normal to the specimen 602 surface. This detection channel may therefore be commonly referred to as a "top" channel, and the optical based subsystem 601 may also include two or more side channels configured as described above. As such, the optical based subsystem 601 may include at least three channels (i.e., one top channel and two side channels), and each of the at least three channels has its own collector, each of which is configured to collect light at different scattering angles than each of the other collectors.

As described further above, each of the detection channels included in the optical based subsystem 601 may be configured to detect scattered light. Therefore, the optical based subsystem 601 shown in FIG. 6 may be configured for dark field (DF) output generation for specimens 202. However, the optical based subsystem 601 may also or alternatively include detection channel(s) that are configured for bright field (BF) output generation for specimens 202. In other words, the optical based subsystem 601 may include at least one detection channel that is configured to detect light specularly reflected from the specimen 602. Therefore, the optical based subsystems 201 described herein may be configured for only DF, only BF, or both DF and BF imaging. Although each of the collectors are shown in FIG. 6 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 614 may be configured to generate images of the specimen 602 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 6 is provided herein to generally illustrate a configuration of an optical based subsystem 601 that may be included in the system embodiments described herein or that may generate optical based output that is used by the system embodiments described herein. The optical based subsystem 601 configuration described herein may be altered to optimize the performance of the optical based subsystem 601 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 614 may be coupled to the components of the system 600 in any suitable manner (e.g., via one or more transmission media, which may include wired and/or wireless transmission media) such that the processor 614 can receive output. The processor 614 may be configured to perform a number of functions using the output. The system 600 can receive instructions or other information from the processor 614. The processor 614 and/or the electronic data storage unit 615 optionally may be in electronic communication with a wafer inspection tool, a wafer metrology tool, or a wafer review tool (not illustrated) to receive additional information or send instructions. For example, the processor 614 and/or the electronic data storage unit 615 can be in electronic communication with an SEM.

The processor 614, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 614 and electronic data storage unit 615 may be disposed in or otherwise part of the system 600 or another device. In an example, the processor 614 and electronic data storage unit 615 may be part of a standalone control unit or in a centralized quality control unit. Multiple processors 614 or electronic data storage units 615 may be used.

The processor 614 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 614 to implement various methods and functions may be stored in readable storage media, such as a memory in the electronic data storage unit 615 or other memory.

If the system 600 includes more than one processor 614, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 614 may be configured to perform a number of functions using the output of the system 600 or other output. For instance, the processor 614 may be configured to send the output to an electronic data storage unit 615 or another storage medium. The processor 614 may be further configured as described herein.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 614 may be configured according to any of the embodiments described herein. The processor 614 also may be configured to perform other functions or additional steps using the output of the system 600 or using images or data from other sources. The processor 614 may include or may operate a machine learning module.

Various steps, functions, and/or operations of system 600 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 614 or, alternatively, multiple processors 614. Moreover, different subsystems of the system 600 may include one or more computing or logic systems. Therefore, the above description should not be interpreted as a limitation on the present disclosure but merely an illustration.

In an instance, the processor 614 is in communication with the system 600. The processor 614 is configured to operate any of the methods 200-500. The electronic data storage unite 615 may include a database that includes defect locations, test images, reference images, difference images, or attributes.

An additional embodiment relates to a non-transitory computer-readable medium storing program instructions executable on a controller for performing a computer-implemented method for finding DOI on a surface of a specimen 602, as disclosed herein. In particular, as shown in FIG. 6, electronic data storage unit 615 or other storage medium may contain non-transitory computer-readable medium that includes program instructions executable on the processor 614. The computer-implemented method may include any step(s) of any method(s) described herein, including any of methods 200-500.

Program instructions implementing methods such as those described herein may be stored on computer-readable medium, such as in the electronic data storage unit 615 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

While disclosed in an optical system, the embodiments disclosed herein also can be performed in a system that uses an electron beam, an ion beam, or an x-ray.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
    a light source that generates a beam of light;
    a stage configured to hold a semiconductor wafer in a path of the beam of light;
    a detector that receives the beam of light reflected from the semiconductor wafer; and
    a processor in electronic communication with the detector, wherein the processor is configured to report a location of a defect of interest that is common across a first layer and a second layer of the semiconductor wafer based on defect locations, wherein the first layer and the second layer are part of a series of layers on the wafer, an wherein the processor is further configured to:
        receive defect locations of the first layer;
        receive defect locations of the second layer;
        perform common-unique analysis thereby determining the defect locations that exist across the first layer and the second layer and determining the defect locations that are unique to one of the first layer or the second layer; and
        filter common events that are at a similar location on the first layer and the second layer thereby excluding the defect locations that are unique to one of the first layer or the second layer, wherein the location of the defect of interest is based on one of the common events.

2. The system of claim 1, wherein the processor is further configured to receive defect attributes of the first layer and defect attributes of the second layer, wherein filtering the common events uses the defect attributes, and wherein the defect attributes of the first layer and the second layer include signal strength, shape, size, location relative to a point, brightness, difference in brightness relative to background, or location on a design.

3. The system of claim 2, wherein the system further comprises a convolutional neural network operated by the processor, and wherein the convolutional neural network is configured to filter all the common events.

4. The system of claim 1, wherein the processor is configured to provide instructions to the system to perform a hot scan of the semiconductor wafer using the light source and the detector that provides the defect locations of the first layer and the defect locations of the second layer.

5. The system of claim 1, wherein the processor is further configured to:
    receive a difference image of the first layer for each of the defect locations on the first layer, wherein the difference image of the first layer is between neighboring dies on the first layer;
    receive a difference image of the second layer for each of the defect locations on the second layer, wherein the difference image of the second layer is between neighboring dies on the second layer;
    compare the difference image of the first layer and the difference image of the second layer; and
    filter defects for which the difference image of the first layer and the difference image of the second layer are similar thereby determining the defect of interest.

6. The system of claim 5, wherein the processor is configured to provide instructions to the system to perform a hot scan of the semiconductor wafer using the light source and the detector that is used to generate the difference image of the first layer and the difference image of the second layer.

7. The system of claim 1, wherein the processor is further configured to:
    receive a test image and a reference image for each of the defect locations on the first layer;
    receive a test image and a reference image for each of the defect locations on the second layer;
    calculate one or more attributes using a convolutional neural network operated by the processor, wherein the one or more attributes filter nuisance events and are based on the test image and the reference image for the first layer and the test image and the reference image for the second layer, and wherein the test image and the reference image for the first layer and the test image and the reference image for the second layer are used as channels; and
    filter nuisance events with the one or more attributes thereby determining the defect of interest.

8. The system of claim 7, wherein the processor is configured to identify a new attribute to filter the nuisance events based on the test image and the reference image for the first layer and the test image and the reference image for the second layer.

9. The system of claim 7, wherein the processor is configured to provide instructions to the system to perform a hot scan of the semiconductor wafer using the light source and the detector that is used to generate the test image and the reference image of the first layer and the test image and the reference image of the second layer.

10. A method comprising:
performing a hot scan of a semiconductor wafer using a wafer inspection system to determine defect locations of a first layer and defect locations of a second layer, wherein the first layer and the second layer are part of a series of layers on the wafer;
receiving, at the processor, the defect locations of the first layer;
receiving, at the processor, the defect locations of the second layer;
performing, using the processor, common-unique analysis thereby determining the defect locations that exist across the first layer and the second layer and determining the defect locations that are unique to one of the first layer or the second layer;
filtering, using the processor, common events that are at a similar location on the first layer and the second layer thereby excluding the defect locations that are unique to one of the first layer or the second layer; and
reporting, using a processor, a location of a defect of interest on the semiconductor wafer that is common across a first layer and a second layer of the semiconductor wafer based on defect locations, wherein the reporting the location of the defect of interest is based on one of the common events.

11. The method of claim 10, further comprising receiving, at the processor, defect attributes of the first layer and defect attributes of the second layer, wherein filtering the common events uses the defect attributes, and wherein the defect attributes of the first layer and the second layer include signal strength, shape, size, location relative to a point, brightness, difference in brightness relative to background, or location on a design.

12. The method of claim 10, further comprising:
receiving, at the processor, a difference image of the first layer for each defect location on the first layer, wherein the difference image of the first layer is between neighboring dies on the first layer;
receiving, at the processor, a difference image of the second layer for each defect location on the second layer, wherein the difference image of the second layer is between neighboring dies on the second layer;
comparing, using the processor, the difference image of the first layer and the difference image of the second layer; and
filtering, using the processor, defects for which the difference image of the first layer and the difference image of the second layer are similar thereby determining the defects of interest.

13. The method of claim 10, further comprising:
receiving, at the processor, a test image and a reference image for each defect location on the first layer;
receiving, at the processor, a test image and a reference image for each defect location on the second layer;
calculating, using the processor, one or more attributes using a convolutional neural network operated by the processor, wherein the one or more attributes filter nuisance events and are based on the test image and the reference image for the first layer and the test image and the reference image for the second layer, and wherein the test image and the reference image for the first layer and the test image and the reference image for the second layer are used as channels; and
filtering, using the processor, nuisance events with the one or more attributes thereby determining the defect of interest.

14. The method of claim 13, wherein a difference image is formed from the test image and the reference image corresponding to the test image, and wherein the difference image is used as one of the channels.

15. The method of claim 13, wherein a difference image is formed between neighboring dies on the test image on the first layer or neighboring dies on the test image on the second layer.

16. The method of claim 13, further comprising identifying a new attribute, using the processor, to filter the nuisance events based on the test image and the reference image for the first layer and the second layer.

17. A non-transitory computer readable medium storing a program configured to instruct a processor to execute the method of claim 10.

18. The method of claim 10, further comprising, using the processor, providing instructions to the wafer inspection system to perform the hot scan of the semiconductor wafer that provides the defect locations of the first layer and the defect locations of the second layer.

* * * * *